United States Patent [19]

Pews et al.

[11] Patent Number: 5,591,503
[45] Date of Patent: Jan. 7, 1997

[54] MAGNETIC RECORDING MEDIUM HAVING A THIN FILM MAGNETIC LAYER AND A SULFONAMIDE LUBRICANT

[75] Inventors: R. Garth Pews; Ted A. Morgan; Kishore K. Kar, all of Midland, Mich.

[73] Assignee: The Dow Chemical Company, Midland, Mich.

[21] Appl. No.: 438,943

[22] Filed: May 10, 1995

Related U.S. Application Data

[63] Continuation-in-part of Ser. No. 249,184, May 25, 1994, abandoned.

[51] Int. Cl.$^6$ .................................................. G11B 5/72
[52] U.S. Cl. ................ 428/65.4; 428/336; 428/694 TP; 428/694 TC; 428/694 TF; 428/900; 427/131
[58] Field of Search ....................... 428/694 TP, 694 TF, 428/694 BP, 694 BF, 336, 900, 694 TC, 65.4; 427/131

[56] References Cited

U.S. PATENT DOCUMENTS

| | | | |
|---|---|---|---|
| 2,236,168 | 3/1941 | Dietrich | 252/47 |
| 2,287,639 | 6/1942 | Pings | 252/48 |
| 2,537,428 | 1/1951 | Seon et al. | 260/297 |
| 2,693,304 | 12/1954 | Henkel et al. | 252/355 |
| 2,740,814 | 4/1956 | Cross et al. | 260/556 |
| 2,748,082 | 5/1956 | Zachar | 252/47.5 |
| 3,238,257 | 3/1966 | Ballard et al. | 260/556 |
| 3,287,267 | 11/1966 | Yonezaki et al. | 252/47.5 |
| 3,687,870 | 8/1972 | Muzyczko et al. | 252/545 |
| 3,711,408 | 1/1973 | Karll et al. | 252/47.5 |
| 3,941,834 | 3/1976 | Lee | 260/504 |
| 3,943,154 | 3/1976 | Richter et al. | 260/397.6 |
| 4,122,266 | 10/1978 | de Vries | 544/158 |
| 4,128,673 | 12/1978 | Watanabe et al. | 427/130 |
| 4,726,990 | 2/1988 | Shimozawa et al. | 428/323 |
| 4,889,939 | 12/1989 | Caporiccio et al. | 549/13 |
| 5,034,525 | 7/1991 | Dekura | 544/196 |
| 5,128,216 | 7/1992 | Ng | 428/694 TF |

FOREIGN PATENT DOCUMENTS

| | | | |
|---|---|---|---|
| 63183956 | 8/1992 | Japan | C08L 77/00 |
| H238456 | 8/1992 | Japan | C08L 77/06 |

*Primary Examiner*—Stevan A. Resan
*Attorney, Agent, or Firm*—John B. Treangen

[57] ABSTRACT

A magnetic recording medium, comprising a substrate, a magnetic recording lamina and at least one sulfonamide wherein the at least one sulfonamide is present in an amount sufficient to provide desirable tribological properties. A process for lubricating magnetic recording media comprising applying at least one sulfonamide to a surface of the magnetic recording media or incorporating at least one sulfonamide into the lamina of the magnetic recording media.

17 Claims, No Drawings

5,591,503

MAGNETIC RECORDING MEDIUM HAVING A THIN FILM MAGNETIC LAYER AND A SULFONAMIDE LUBRICANT

CROSS-REFERENCE TO RELATED APPLICATION

This application is a continuation-in-part of U.S. Ser. No. 08/249,184, filed May 25, 1994, now abandoned (incorporated herein by reference).

BACKGROUND OF THE INVENTION

The present invention is related to lubricants, more particularly lubricants useful in magnetic recording media.

The demands placed on existing lubricants are currently undergoing significant changes. For example, lubricants are needed for use in magnetic recording media such as high density rigid disks, ultra high density floppy disks, digital audio tapes and video tapes which can be read by a magnetic recording head. In use of these media, a recording head is in very close proximity to the recording media and frequently contacts the recording media. Such contact causes wear of the thin layer of magnetic material on the recording media and shortens the useful life of the recording media. With insufficiently effective lubricants, there are problems including increased friction, scratching, and adhesion. Therefore, new efficient lubricants are desirable.

SUMMARY OF THE INVENTION

In one respect, the invention is a magnetic recording medium, comprising a substrate, a magnetic recording lamina and at least one sulfonamide wherein the at least one sulfonamide is present in an amount sufficient to provide desirable tribological properties.

Recording media containing a sulfonamide of the present invention are physically and magnetically durable. In addition, the sulfonamides are readily processed in manufacturing because the sulfonamides are compatible in organic solvents such as toluene, acetone, ethanol and tetrahydrofuran.

In another respect, this invention is a process useful for lubricating a magnetic recording medium, comprising applying at least one sulfonamide to a surface of the magnetic recording medium to provide a sulfonamide film having an average thickness of 1 to 1000 ångstroms on the surface.

In still another respect, this invention is a process useful for lubricating a magnetic recording media, comprising incorporating at least one sulfonamide into a particulate magnetic recording lamina during preparation of the magnetic recording media so that the particulate magnetic recording lamina contains 0.001 to 10 wt % of sulfonamide.

DETAILED DESCRIPTION OF THE INVENTION

The invention includes compositions based on high density recording media, such as high density rigid disks, ultra high density floppy disks, digital audio tape, 8 mm video tape and super VHS tape which include a sulfonamide lubricant used as an internal or topical lubricant system to minimize wear, improve overall performance, and to protect the media from damage from the reading and/or writing head of a disk assembly.

The sulfonamides of this invention contain less than 60 carbons and can be represented by the formula $R_1-SO_2NR_2R_3$ wherein $R_1$ is an unsubstituted alkyl of up to 18 carbons, preferably of from 4–10 carbons; or an aromatic moiety of up to 12 carbons which can be substituted by halo, methyl, ethyl, methoxy, ethoxy, trihalomethyl, trihalomethoxy or polyhaloethoxy. The aromatic moiety can be substituted by up to five substituents. $R_2$ and $R_3$ are independently hydrogen, aromatic of up to 18 carbons or alkyl of up to 20 carbons, preferably methyl, octyl, dodecyl or octadecyl, with the proviso that no more than one of $R_2$ and $R_3$ can be hydrogen. When $R_2$ or $R_3$ is an aromatic moiety, the aromatic moiety is preferably phenyl. In $R_1$ the aromatic moiety can contain one or more hetero atoms within a ring, preferably by one or more nitrogen atoms. In $R_1$ the aromatic moiety can also be phenoxyphenyl. In $R_1$ the aromatic moiety can be phenyl, naphthyl, biphenyl, quinolinyl, pyridinyl, pyridazinyl, pyrimidinyl. Preferred aromatic moieties for $R_1$ include phenyl, naphthyl, quinolinyl and phenoxyphenyl. In $R_1$, halo is preferably chloro or fluoro. Preferably, for trihalomethyl and polyhaloethoxy, halo is fluoro.

Representative examples of sulfonamides of this invention are N-methyl-N'-phenylbutanesulfonamide, N,N'-di-n-octyl-2,4-bis(2,2,2-trifluoroethoxy)benzenesulfonamide, N,N'-di-n-octyl-3-trifluoromethylbenzenesulfonamide, N,N'-di-n-octyl-2,4-diethoxybenzenesulfonamide, N,N'-di-n-octyl-4-(3-trifluoromethylphenoxy)benzenesulfonamide, N,N'-di-n-octyl-2,4-dichlorobenzenesulfonamide, N,N'-di-n-octyl-3,4-difluorobenzenesulfonamide, N,N'-di-n-octyl-8-quinolinesulfonamide, N,N'-di-n-octyl-4-phenoxybenzenesulfonamide, N-N'-di-n-octyl-4-chlorobenzenesulfonamide, N,N'-di-n-octyl-2-napthalenesulfonamide, N,N'-di-n-octylbenzenesulfonamide, N,N'-di-n-octylbutanesulfonamide, N-dodecylbenzenesulfonamide, N,N'-di-n-octylpentafluorobenzenesulfonamide, N-dodecyl-3-trifluoromethylbenzenesulfonamide and N-octadecyl-3-trifluoromethylbenzenesulfonamide. One preferred sulfonamide is when $R_1$ is a trihalomethyl substituted aromatic moiety, $R_2$ is n-octyl, and $R_3$ is n-octyl. An example of this preferred sulfonamide is N,N'-di-n-octyl-3-trifluoromethylbenzenesulfonamide.

The sulfonamides can be prepared by reacting an appropriate sulfonyl chloride and an appropriate mono- or di-substituted amine. The (disubstituted) amine cannot be a compound that is so strictly hindered that reaction cannot occur with the sulfonyl chloride. The reaction can be run in a solvent such as toluene. Choice of solvent is not critical so long as the reactants are soluble in the solvent in the presence of an acid acceptor. Reaction temperature will vary depending on the type of reactants, choice of solvent, pressure and similar parameters and can be adjusted so that reaction occurs. Generally, reaction temperature is in the range from 20° C. to 150° C., though higher or lower temperatures can be used. After an appropriate reaction time, when the desired extent of reaction has been achieved, the desired product can be isolated and purified by conventional techniques, generally by filtration, crystallization, washing, distillation and the like.

When used as an additive or co-lubricant to a lubricant base stock, the sulfonamides of the present invention must be compatible with the base stock. By compatible it is meant that the sulfonamide is readily dispersible or soluble in the base stock, either with or without the addition of an appropriate surfactant. Examples of known lubricant base stocks useful in the lubricant compositions of this invention include organic oils and greases. When the sulfonamides of the present invention are used as additives to conventional, compatible base stocks, it is preferred that the base stocks are poly alpha olefins, polyglycols, polyphenyl ethers, polyol esters or fatty acid esters. It is more preferred that the base stocks are fatty acid esters or polyphenyl ethers such as 5P4E (a polyphenyl ether having 5 phenyl rings with 4 ether linkages). Other preferred base stocks include polyol esters such as pentaerythritol tetra $C_5$–$C_9$ esters (PET) and poly alpha olefins. The lubricant compositions of this invention comprise from about 0.1 to about 100 wt % of one or more sulfonamides. When the sulfonamides of this invention are used as components of lubricant compositions, it is preferred that the sulfonamides are used in amounts greater than about 0.5 wt %, more preferably greater than about 5 wt %. It is also preferred that the sulfonamides of the present invention, when used as additives, are used in amounts of less than about 50 wt %, preferably less than about 20 wt %.

A preferred embodiment of the present invention is a magnetic recording media comprising a substrate having a particulate or thin film magnetic recording lamina thereon, the lamina comprising magnetic particles with a binder in the case of particulate media or without a binder in the case of thin film media, for instance nickel-cobalt. The lamina includes a lubricating amount of one or more sulfonamides used as either an internal or topical lubricant. Critical to the invention is that the sulfonamides must be present in an amount sufficient to provide desirable tribological properties for the media. This amount, however, is dependent upon the type of media utilized such as either thin film magnetic media or particulate magnetic media. The sulfonamides of this invention are particularly useful as topical lubricants for thin film magnetic recording media. Thin film magnetic recording media generally include a substrate which may be a non-magnetic metal or a plastic such as a polyester (e.g. polyethylene terephthalate). A magnetic film such as a metal or a metal alloy such as cobalt-nickel is applied to the substrate. The thickness of the magnetic layer is on the order of 0.20 micrometers. The one or more sulfonamides is preferably on the surface of the magnetic layer in a thickness of from about 1 to about 1000 ångströms ($10^{-10}$ to $10^{-7}$m), more preferably from about 5 to about 100 ångströms. A particular class of such recording media is metal evaporated tape. Such tape and methods of making this tape is described by Chiba et al. in "Metal Evaporated Tape for High Band 8MM Video System," *IEEE Transactions on Consumer Electronics*, Vol. 35, No. 3, pages 421–28 (August, 1989).

Similarly, the sulfonamides are useful in particulate magnetic recording media. Particulate magnetic recording media generally include a substrate which may be a non-magnetic metal or a plastic such as polyester. Magnetic particle containing pigments such as cobalt gamma $Fe_2O_3$, barium ferrite and iron metal, with a binder, are applied to the substrate. The amount of pigment can vary from about 17 to about 21 wt % based on total formulation weight and a preferred range of from about 17 to about 19 wt %. The binder is advantageously a thermosetting resin such as urethane, vinyl or a combination thereof, present in an amount between about 2.5 and about 6.0 wt %, based on total formulation weight and a preferred range between about 3 and about 6 wt %.

The amount of sulfonamide employed in the particulate magnetic recording media is from 0.001 to 10 wt % of the total magnetic recording lamina. Preferably, the sulfonamide is less than 5 wt % of the magnetic recording lamina. Preferably, the sulfonamide is greater than 0.02 wt % of the magnetic recording lamina with an internal sulfonamide lubricant.

When used as a topical lubricant for either particulate or thin film media, the sulfonamide is conveniently applied to the surface either neat or in solution with a volatile solvent. Representative examples of the volatile solvents for the sulfonamide include aromatic hydrocarbons such as benzene, toluene, and xylene; ethers such as diethyl ether, dimethoxyethane, dioxane, tetrahydrofuran and diethoxyethane; halogenated hydrocarbons such as chloroform, dichloromethane and carbon tetrachloride; alcohols such as methanol and ethanol; ketones such as methyl ethyl ketone and acetone; esters such as ethyl acetate; alicyclic hydrocarbons such as cyclohexane; dimethylformamide; dimethylsulfoxide and silicone fluids.

Alternatively, when used as an internal lubricant in particulate magnetic media, the sulfonamide is included in the composition of the mixture applied to the substrate to form the recording lamina. This mixture includes binder, pigment containing magnetic particles and a volatile solvent together with the lubricant. Representative solvents for the sulfonamide include those listed for topical uses.

Alternatively, the sulfonamide is used topically in thin film, or non-porous hard and flexible magnetic media.

The following examples are provided for illustrative purposes only and should not be construed as limiting the scope of the invention or the claims. Unless stated otherwise, all parts, ratios and percentages are by weight.

EXAMPLES

Preparation of Several Sulfonamides

The following preparations are provided to illustrate procedures for making sulfonamides of this invention.

N-Methyl-N'-phenylbutanesulfonamide

N'-Methylaniline (21.5 g, 0.2 mol) and triethylamine (35 mL) were diluted with toluene (250 mL). Butanesulfonyl chloride (31 g, 0.2 mol) was added to the toluene solution at room temperature with stirring. The reaction was exothermic. After cooling to room temperature, the triethylamine hydrochloride was filtered and the toluene solution washed with dilute HCl, dilute NaOH and $H_2O$ and dried over $MgSO_4$. The solution was treated with activated carbon (Darco™) and the toluene removed in vacuum. Calculated for $C_{11}H_{17}NO_2S$ 227 found 227. $^1$H NMR (CDCl$_3$) δ0.92 (t, 3, CH$_3$), 1.43 (m, 2, CH$_2$), 1.80 (m, 2, CH$_2$), 2.98 (t, 2, CH$_2$N), 3.35 (s,3, CH$_3$N), 7.10–7.50 (m, 5, aromatic).

N,N'-di-n-octyl-2,4-bis(2,2,2-trifluoroethoxy)benzenesulfonamide

N,N'-di-n-octyl-2,4-dichlorobenzenesulfonamide (20 g, 0.045 mol) was heated at 140° C. for 3 hours in diglyme (100 mL) containing sodium trifluoroethoxide (0.2 mol). The product was isolated by extraction with toluene and purified by column chromatography using alumina. Calculated for $C_{26}H_{42}F_6NO_4S$ 578, found 578. $^1$H NMR (CDCl$_3$) δ0.87 (t, 6, CH$_3$), 1.22 (m, 20, CH$_2$), 1.45 (t, 4, CH$_2$), 3.20 (t, 6, CH$_2$N). 4.42 (m, 4, CH$_2$CF$_3$), 6.59 (d, 1, H-4), 7.26 (s, 1, H-3), 7.96 (d, 1, H-5).

N,N'-di-n-octyl-3-trifluoromethylbenzenesulfonamide

3-Trifluoromethylbenzenesulfonyl chloride (50 g, 0.20 mol) was added to a toluene solution (500 mL) of di-n-octylamine (48 g, 0.2 mol) and triethylamine (35 mL, 20 percent excess). After stirring at room temperature for 2 hours, the triethylamine hydrochloride was filtered and the toluene solution washed with dilute HCl, dilute NaOH and H2O. The product was purified by column chromatography using alumina. Calculated for $C_{23}H_{38}F_3NO_2S$ 449, found 449. $^1$H NMR (CDCl$_3$) δ0.88 (t, 6, CH$_3$), 1.27 (m, 20, CH$_2$), 1.53 (t, 4, CH$_2$), 3.12 (t, 6, CH$_2$N), 7.06 (d, 2, Ar(ortho-SO$_2$), 7.25 (t), 7.31 (s), 7.50 (m) (4, H-2, H-4, H-5, H-6), 7.80 (d, 4, meta-SO$_2$).

N, N'-di-n-octyl,2,4-diethyoxybenzenesulfonamide

N,N'-Di-n-octyl-2,4-dichlorobenzenesulfonamide (40.4 g, 0.09 mol) was heated at 120° C. for 2.5 days with 300 mL of a sodium ethoxide solution (0.5 mol sodium) in a Parr reactor. The product was isolated by extraction with toluene and purified by column chromatography using alumina. Calculated for $C_{26}H_{47}NO_4S$ 469, found 469.

$^1$H NMR (CDCl$_3$) δ0.87 (t, 6, CH$_3$), 1.22 (m, 20, CH$_2$), 1.48 (t, 4, CH$_2$), 2.47 (t, 6, CH$_3$), 3.20 (t, 6, CH$_2$N), 4.06 (m, 4, OCH$_2$), 6.45 (d, 1, H-5), 7.26 (s, 1, H-3), 7.84 (d, 1, H-6).

N,N'-di-n-octyl-4-(3-trifluoromethylphenoxy)benzenesulfonamide

N,N'-Di-n-octyl-4-chlorobenzenesulfonamide (83 g, 0.2 mol) and sodium 3-trifluoromethylphenoxide (0.28 mol, 40 percent excess) were heated overnight in 500 mL of N-methylpyrollidinone. The product was isolated by extraction with toluene and purified by column chromatography using alumina. Calculated for $C_{29}H_{42}F_3NO_3S$ 541 found, 541. $^1$H NMR (CDCl$_3$) δ0.87 (t, 6, CH$_3$), 1.24 (m, 20, CH$_2$), 1.50 (t, 4, CH$_2$), 3.14 (t, 4, CH$_2$N), [7.64 (t), 7.79 (d), 7.98 (d) 8.06 (s) 4H aromatic].

N,N'-di-n-octyl-2,4-dichlorobenzenesulfonamide

A solution of di-n-octylamine (181 g, 0.75 mol) and triethylamine (1 mol, 140 mL) was added dropwise at room temperature to a solution of 2,4-dichlorobenzenesulfonyl chloride (183 g, 0.75 mol) in toluene (1800 mL). The reaction was stirred for 2 hours, then filtered to remove the precipitated triethylamine hydrochloride. The toluene solution was washed with dilute HCl; dilute NaOH and water; and dried over MgSO$_4$. The toluene was evaporated in vacuo on a rotary evaporator and the residue diluted with hexane (1500 mL) and purified by column chromatography using basic, acidic and neutral alumina to obtain a white solid m.p. 40–42° C. Calculated for $C_{22}H_{37}NCl_2O_2S$ 449, found 449. $^1$H NMR (CDCl$_3$) δ0.87 (t, 6, CH$_3$), 1.21 (m, 20, CH$_2$), 1.49 (t, 4, CH$_2$), 3.26 (t, 4, CH$_2$N), (7.26 (s), 7.36 (d), 7.50 (s), 8.02(d) (3H, aromatic).

N,N'-di-n-octyl-3,4-difluorobenzenesulfonamide 3,4-Difluorobenzenesulfonyl chloride (80 g, 0.377 mol) was added to a toluene (1000 mol) solution of di-n-octylamine (91 g, 0.377 mol) and triethylamine (57 mL, 10 percent excess). After refluxing for 1 hour, the product was isolated by extraction and purified by column chromatography using alumina. Calculated for $C_{22}H_{37}F_2NO_2S$ 417, found 417. $^1$H NMR (CDCl$_3$) δ0.90 (t, 6, CH$_3$), 1.25 (m, 20, CH$_2$), 1.50 (t, 4, CH$_2$), 3.10 (t, 4, CH$_2$N) 7.27, 7.62 (m, 3, aromatic).

N,N'-n-octyl-8-quinolinesulfonamide

Di-n-octylamine (60 g, 0.25 mol) was dissolved in toluene (500 mL) and 8-quinolinesulfonyl chloride (25 g, 0.11 mol) was added at room temperature. The solution was refluxed for 1 hour. After cooling, the amine salts were removed by filtration. After dilution with water, more precipitate was formed and removed by filtration. The toluene solution was washed with water, dried and filtered through basic alumina. Calculated for $C_{23}H_4O\ N_2O_2S$ 408, found 408. GC-MS did not give a parent peak. $^1$H NMR (CDCl$_3$) δ0.88 (t, 3, CH$_3$), 1.22 (s, 10, CH$_2$), 1.48 (sb, 2, CH$_2$), 3.42 (t, 2, CH$_2$), 7.50 (m), 7.59(t), 8.00 (d) 8.22 (d) 8.49 (d), 9.06 (d) (6, aromatic).

N,N'-di-n-octyl-4-phenoxybenzenesulfonamide

N,N'-Di-n-octyl-4-chlorobenzenesulfonamide (20.75 g, 0.05 mol) and sodium phenate (11.6 g, 0.1 mol) were heated at 110° C. for 48 hours in dimethyl sulfoxide (100 mL). The product was isolated by extraction with toluene and purified by filtration through Gr 1 acid and basic alumina. Calculated for $C_{28}H_{42}NO_3S$ 472, found 472. $^1$H NMR (CDCl$_3$) δ0.87 (t, 3, CH$_3$), 1.26 (s, 10, CH$_2$), 2.50 (sb, 2, CH$_2$), 3.09 (t 2, CH$_2$), 7.02, 7.20, 7.40 7.74 (m, 4, aromatic).

N-N'-di-n-octyl-4-chlorobenzenesulfonamide 4-Chlorobenzenesulfonamide (21.1 g, 0.1 mol) was added to a stirred solution of toluene (300 mL) containing di-n-octylamine (24.1 g, 0.1 mol) and triethylamine (20 mL). The product was isolated as described for N,N'-di-n-octyl napthalenesulfonamide. Calculated for $C_{22}H_{38}ClNO_2S$ 415, found 415. $^1$H NMR (CDCl$_3$) δ0.88 (t, 3, CH$_3$), 1.24 (s, 10, CH$_2$), 1.50 (s, 2, CH$_2$), 3.10 (t, 2, CH$_2$) 7.45, 7.74 (m, 2, aromatic).

N,N'-di-n-octyl-2-napthalenesulfonamide 2-Napthalenesulfonyl chloride (25 g, 0.11 mol) was added as a solid to a toluene (300 mL) solution of di-n-octylamine (26.52 g, 0.11 mol) and triethylamine (15.0 g, 0.15 mol). After refluxing for 0.5 hours, the product was isolated by extraction, then dried over MgSO$_4$. After removal of the toluene, the product was diluted with hexane and filtered through both acid and basic alumina. $^1$H NMR δ0.86 (t, 6, CH$_3$), 1.22 (s, 20, CH$_2$), 1.52 (s, 4, CH$_2$), 3.17 (t, 4, CH$_2$), 7.60–7.94 (m, 6, aromatic), 8.38 (s, 1, aromatic).

N,N'di-n-octylbenzenesulfonamide

Benezenesulfonyl chloride (17.6 g, 0.1 mol) was dissolved in toluene (100 mL) and added dropwise to a toluene (500 mL) solution of di-n-octylamine (24.1 g, 0.1 mol) and triethylamine (10.1 g, 0.1 mol). After the addition was complete, the solution was refluxed for 15 minutes, cooled, filtered and washed with H$_2$O and aqueous sodium hydroxide (5 percent). After drying over MgSO$_4$, the product was obtained as an oil. Calculated for $C_{22}H_{39}NO_2S$ 381, found 381. $^1$H NMR (CDCl$_3$), δ0.86 (t, 6, CH$_3$), 1.24 (s, 20, CH$_2$), 1.49 (s, 4, CH$_2$), 3.09 (s, 4, CH$_2$), 7.49 (m, 3, 7.90 (m, 2, aromatic).

N,N'-di-n-octylbutanesulfonamide

Dioctylamine (24.1 g, 0.2 mol) and triethylamine (10.1 g, 0.10 mol) were diluted with toluene (250 mL) and then butanesulfonyl chloride (15.6 g, 0.2 mol) in toluene (50 mL) was added dropwise to the amine solution. After the addition was complete, the product was isolated by extraction and distilled on a Kugelohr apparatus bp 180° C. (0.1 mm). Calculated for $C_2O\ H_{43}NO_2S$ 361, found 361. $^1$H NMR (CDCl$_3$) δ0.90 (t, 6, CH$_3$), 0.93 (t, 3, CH$_3$), 1.20 (s, 10, CH$_2$), 1.45 (s, 2, CH$_2$), 1.56 (m, 4, CH$_2$), 1.78 (m 2, CH$_2$), 2.89 (t, 2, CH$_2$), 3.15 (t, 4, CH$_2$).

N-Dodecylbenzenesulfonamide

Benzenesulfonyl chloride (353 g, 2 mol) was added dropwise to a toluene (2000 mL) solution of dodecylamine (371 g, 2 mol) and triethylamine (203 g, 2 mol) with ice bath cooling. During the one hour addition period, the temperature increased to about 40° C. After filtration of the triethylamine hydrochloride, the toluene solution was washed with dilute HCl, dilute NaOH and water. After drying over magnesium sulfate, the toluene was removed in vacuo and the precipitate slurried in hexane and filtered to give 539 g of product. Melting point 57–60° C. Calculated for $C_{18}H_{32}NO_2S$ 326, found 326. $^1$H NMR (CDCl$_3$) δ0.88 (t, 3, CH$_3$), 1.24 (d, 18, CH$_2$), 1.45 (s, 2, CH$_2$), 4.66 (sb, 1, NH), 7.49–7.84 (m, 5, arom.).

N,N'-di-n-octyl-pentafluorobenzenesulfonamide

Di-n-octylamine (22.7 g, 0.094 mol) and triethylamine (10.1 g, 0.094 mol) were diluted with toluene (200 mL). Pentafluorobenzenesulfonyl chloride (25 g, 0.094 mol) was added dropwise to the amine solution at room temperature. After the addition was 5 complete, the triethylamine hydrochloride was filtered and the toluene solution washed with dilute Na$_2$CO$_3$, dilute HCl and water. After drying over magnesium sulfate, the toluene was removed in vacuo and the product recrystallized from hexane. Melting point 53–55° C. Calculated for $C_{22}H_{34}F_5NO_2S$ 471, found 471. $^1$H NMR (CDCl$_3$) δ3.31 (m, 2, CH$_2$), 1.60 (m, 2, CH$_2$), 1.31 (s, 10, CH$_2$), 0.91 (t, 3, CH$_3$).

N-Dodecyl-3-trifluoromethylbenzenesulfonamide

This compound was prepared as described for N-decylbenzenesulfonamide. Melting point 65–68° C. Calculated for $C_{19}H_{31}F_3NO_2S$ 394, found 394. $^1$H NMR (CDCl$_3$) δ0.84 (t, 3, CH$_3$), 1.21 (s, 18, CH$_2$), 1.45 (d, 2, CH$_2$), 2.98 (s, 2CH$_2$), 4.72 (sb, 1, NH), 7.2–8.2 (m, 4, arom.).

N-Octadecyl-3-trifluoromethylbenzenesulfonamide

This compound was prepared as described for N-decylbenzenesulfonamide. Melting point 83–85° C. Calculated for $C_{25}H_{42}F3NO_2S$ 477, found 477. $^1$H NMR (CDCl$_3$) δ0.84 (t, 3, CH$_2$), 1.21 (s, 30, CH$_2$), 1.49 (d, 2, CH$_2$), 3.01 (s 2, CH$_2$), 4.5 (sb, 1, NH), 7.28–8.16 (m, 4, atom.).

EXAMPLE 1

Preparation of Lubricated Magnetic Tape and Testing Thereof

Unlubricated cobalt-nickel metal evaporated magnetic tape (8 mm) is submerged for five minutes in a 1 percent solution of N,N'-di-n-octyl-2-napthalenesulfonamide ("Lube 1"), N,N'-di-n-octyl-benzenesulfonamide ("Lube 2"), N,N'-di-n-octyl-3,4-difluorobenzenesulfonamide ("Lube 3"), N,N'-di-n-octyl-3-trifluoromethylbenzenesulfonamide ("Lube 4"), N,N'-di-n-octyl-2,4-bis(2,2,2-trifluoroethoxy)-benzenesulfonamide ("Lube 5") or N,N'-di-n-octyl-4-(3-trifluoromethylphenoxy)benzenesulfonamide ("Lube 6") in methyl ethyl ketone ("MEK"). The tape is then removed and allowed to dry so that the MEK evaporates to leave a film of lubricant having an average thickness in the range from 5–20 ångström.

The lubricated tapes are then tested using the procedure of ASTM D-3028 using a frictionometer (Custom Scientific Instruments, Inc.) to obtain coefficients of friction. The data is shown in Table I.

TABLE I

| Lube | Coefficient of Friction |
| --- | --- |
| None | 0.35 |
| 1 | 0.13 |
| 2 | 0.08 |
| 3 | 0.09 |
| 4 | 0.06 |
| 5 | 0.26 |
| 6 | 0.14 |

EXAMPLE 2

Preparation of Lubricated Magnetic Hard Disks and Testing Thereof

Unlubricated carbon overcoat and nickel phosphorous 3.75 inch (9.5 cm) magnetic hard disks (also referred to as "rigid disks") (Elixir Products, Fremont, Calif.) are cleaned for 10 minutes in hexane using an ultrasonic bath and next dried in a clean air hood (Class 100) for at least one hour. The disks are then submerged in a 5 inch×8 inch×6 inch stainless steel container containing 0.1 wt % solution of Lubes 2, 3 or 4 in hexane for five minutes. The solution is then drained from the container at a rate of one inch (2.5 cm) per minute. The lubricants adsorb/absorb onto the disks during the residence time in the bath. Next, the disks are dried at room temperature in a clean air hood for at least 1 hour so that the hexane evaporates. The average film thickness of the Lubes on the carbon overcoat magnetic hard disks is 5–20 ångström and is 5–20 ångström on the nickel phosphorus magnetic hard disks. The lubricated magnetic hard disks are tested to test for coefficients of friction and stiction according to the following procedure.

A rigid disk and head wear test system (SD8001, commercially available from Surface Dynamics, Alameda, Calif.) is used which is equipped with a two-rail alumina-titanium carbide slider (MS-13-T13-07-XI, Rank Technologies) having a rail flatness (crown) of +0.5 to +3.5 microinch, a 1 microinch finish of the air-bearing surface (ABS), a camber of −1 to +1 microinch, a twist of −2 to +2 microinch, an edge blend of 100 microinch minimum to 300 microinch maximum, no cracks and scratches no wider than 0.3 microinch and enclosed chips no larger than 4 microinch width by 5 microinch length. The head wear test system measures the static and dynamic friction between the magnetic hard disk and slider. The head wear test system is controlled by a host computer equipped with MEGASISS™ software and data generated is collected and stored by the computer. During the test, the lubricated magnetic hard disks are loaded into the head wear test system and spun such that the surface velocity of the disk is $3.4 \times 10^4$ inches per minute at a radial distance of 1.5 inch (3600 rpm, $8.6 \times 10^4$ cm per minute) with a 7 gram head load. At 3600 rpm, the slider is suspended over the disk due to the flow of air between the slider and the disk surface. During the test, the disk speed is periodically slowed until the slider touches down. After every 500 cycles, the coefficient of friction is measured and recorded at 5 rpm. The coefficient of stiction (the force required to start the disk) is measured during the first 30 millisecond of each cycle. The results of the testing are reported below in Tables II through V. In the Tables, the column termed "Contact Start-Stop Cycles" shows the number of times the disk is started and stopped at which time coefficient of friction and stiction are measured. In the Tables, phrase "Coef. Fric." means coefficient of friction and the phrase "Coef. Stic." means coefficient of stiction.

In Tables II and III, nickel phosphorus magnetic hard disks are tested.

TABLE II

| Contact Start-Stop Cycle | Coef. Fric. Control Disk | Coef. Fric. Disk with Lube 2 | Coef. Fric. Disk with Lube 3 | Coef. Fric. Disk with Lube 4 |
| --- | --- | --- | --- | --- |
| 0 | 0.107 | 0.187 | 0.040 | 0.060 |
| 500 | 0.507 | 0.347 | 0.187 | 0.280 |
| 1000 | 0.507 | 0.333 | 0.187 | 0.280 |
| 1500 | 0.520 | 0.360 | 0.187 | 0.280 |
| 2000 | 0.600 | 0.333 | 0.173 | 0.260 |
| 2500 | 0.653 | 0.320 | 0.187 | 0.280 |
| 3000 | 0.547 | 0.320 | 0.187 | 0.280 |
| 3500 | 0.533 | 0.307 | 0.173 | 0.260 |
| 4000 | 0.653 | 0.320 | 0.200 | 0.300 |
| 4500 | 0.467 | 0.253 | 0.173 | 0.260 |
| 5000 | 0.440 | 0.240 | 0.173 | 0.260 |
| 5500 | 0.467 | 0.280 | 0.200 | 0.300 |
| 6000 | 0.533 | 0.240 | 0.200 | 0.300 |
| 6500 | 0.493 | 0.307 | 0.200 | 0.300 |
| 7000 | 0.493 | 0.280 | 0.173 | 0.260 |
| 7500 | 0.533 | 0.360 | 0.200 | 0.300 |
| 8000 | 0.453 | 0.280 | 0.187 | 0.280 |
| 8500 | 0.440 | 0.267 | 0.213 | 0.320 |
| 9000 | 0.467 | 0.267 | 0.227 | 0.340 |
| 9500 | 0.467 | 0.293 | 0.293 | 0.440 |

TABLE III

| Contact Start-Stop Cycle | Coef. Stic. Control Disk | Coef. Stic. Disk with Lube 2 | Coef. Stic. Disk with Lube 3 | Coef. Stic. Disk with Lube 4 |
| --- | --- | --- | --- | --- |
| 0 | 0.080 | 0.293 | 0.080 | 0.120 |
| 500 | 0.960 | 0.787 | 0.227 | 0.340 |

TABLE III-continued

| Contact Start-Stop Cycle | Coef. Stic. Control Disk | Coef. Stic. Disk with Lube 2 | Coef. Stic. Disk with Lube 3 | Coef. Stic. Disk with Lube 4 |
| --- | --- | --- | --- | --- |
| 1000 | 0.747 | 0.693 | 0.227 | 0.340 |
| 1500 | 0.707 | 0.560 | 0.293 | 0.440 |
| 2000 | 1.347 | 0.693 | 0.227 | 0.340 |
| 2500 | 0.707 | 0.600 | 0.227 | 0.340 |
| 3000 | 1.013 | 0.453 | 0.280 | 0.420 |
| 3500 | 1.040 | 0.480 | 0.240 | 0.360 |
| 4000 | 0.680 | 0.533 | 0.293 | 0.440 |
| 4500 | 0.507 | 0.373 | 0.240 | 0.360 |
| 5000 | 0.480 | 0.413 | 0.253 | 0.380 |
| 5500 | 0.507 | 0.573 | 0.360 | 0.540 |
| 6000 | 0.560 | 0.347 | 0.267 | 0.400 |
| 6500 | 0.613 | 0.560 | 0.387 | 0.580 |
| 7000 | 0.587 | 0.587 | 0.373 | 0.560 |
| 7500 | 0.547 | 0.760 | 0.360 | 0.540 |
| 8000 | 0.573 | 0.667 | 0.320 | 0.480 |
| 8500 | 0.480 | 0.707 | 0.427 | 0.640 |
| 9000 | 0.507 | 0.573 | 0.427 | 0.640 |
| 9500 | 0.520 | 0.800 | 0.280 | 0.420 |

TABLE IV

| Contact Start-Stop Cycle | Coef. Fric. Control Disk | Coef. Fric. Disk with Lube 2 | Coef. Fric. Disk with Lube 3 | Coef. Fric. Disk with Lube 4 |
| --- | --- | --- | --- | --- |
| 0 | 0.187 | 0.200 | 0.133 | 0.200 |
| 500 | 0.267 | 0.240 | 0.200 | 0.305 |
| 1000 | 0.333 | 0.200 | 0.240 | 0.360 |
| 1500 | 0.347 | 0.213 | 0.253 | 0.380 |
| 2000 | 0.360 | 0.227 | 0.280 | 0.420 |
| 2500 | 0.373 | 0.213 | 0.293 | 0.440 |
| 3000 | 0.453 | 0.227 | 0.333 | 0.500 |
| 3500 | 0.413 | 0.253 | 0.333 | 0.500 |
| 4000 | 0.320 | 0.213 | 0.307 | 0.461 |
| 4500 | 0.373 | 0.267 | 0.347 | 0.521 |
| 5000 | 0.427 | 0.213 | 0.347 | 0.521 |
| 5500 | 0.400 | 0.240 | 0.320 | 0.480 |
| 6000 | 0.467 | 0.240 | 0.360 | 0.540 |
| 6500 | 0.427 | 0.267 | 0.307 | 0.461 |
| 7000 | 0.453 | 0.227 | 0.347 | 0.521 |
| 7500 | 0.493 | 0.253 | 0.360 | 0.540 |
| 8000 | 0.467 | 0.240 | 0.347 | 0.521 |
| 8500 | 0.440 | 0.240 | 0.333 | 0.500 |
| 9000 | 0.387 | 0.267 | 0.320 | 0.480 |
| 9500 | 0.453 | 0.253 | 0.307 | 0.461 |

TABLE V

| Contact Start-Stop Cycle | Coef. Stic. Control Disk | Coef. Stic. Disk with Lube 2 | Coef. Stic. Disk with Lube 3 | Coef. Stic. Disk with Lube 4 |
| --- | --- | --- | --- | --- |
| 0 | 0.200 | 0.187 | 0.133 | 0.200 |
| 500 | 0.293 | 0.280 | 0.213 | 0.320 |
| 1000 | 0.427 | 0.253 | 0.267 | 0.401 |
| 1500 | 0.413 | 0.293 | 0.320 | 0.480 |
| 2000 | 0.387 | 0.293 | 0.320 | 0.480 |
| 2500 | 0.373 | 0.253 | 0.1373 | 0.560 |
| 3000 | 0.747 | 0.267 | 0.413 | 0.620 |
| 3500 | 0.747 | 0.293 | 0.387 | 0.581 |
| 4000 | 0.347 | 0.267 | 0.373 | 0.560 |
| 4500 | 0.507 | 0.293 | 0.467 | 0.701 |
| 5000 | 0.653 | 0.280 | 0.400 | 0.600 |
| 5500 | 0.587 | 0.307 | 0.387 | 0.581 |
| 6000 | 0.480 | 0.267 | 0.467 | 0.701 |
| 6500 | 0.507 | 0.320 | 0.400 | 0.600 |
| 7000 | 0.520 | 0.293 | 0.453 | 0.680 |
| 7500 | 0.707 | 0.320 | 0.440 | 0.660 |
| 8000 | 0.560 | 0.293 | 0.467 | 0.701 |
| 8500 | 0.533 | 0.293 | 0.413 | 0.620 |
| 9000 | 0.573 | 0.333 | 0.427 | 0.641 |
| 9500 | 0.560 | 0.293 | 0.427 | 0.641 |

It can be seen from the results shown in Tables II through V that the sulfonamides of this invention provide lubricity to magnetic hard disks when applied to the surface of the disks.

Other embodiments of the invention will be apparent to the skilled in the art from a consideration of this specification or practice of the invention disclosed herein. It is intended that the specification and example be considered as exemplary only, with the true scope and spirit of the invention being indicated by the following claims.

We claim:

1. A magnetic recording medium, comprising a substrate having a thin film magnetic recording lamina deposited thereon, wherein the lamina comprises a magnetic layer and at least one sulfonamide, and wherein the at least one sulfonamide is present in an average thickness of 1 to 1000 ångströms, and wherein the sulfonamide contains up to 60 carbon atoms and is of formula $R_1-SO_2NR_2R_3$ wherein $R_1$ is an unsubstituted alkyl of up to 18 carbons or an aromatic moiety of up to 12 carbons which can be substituted by halo, methyl, ethyl, methoxy, ethoxy, trihalomethyl, trihalomethoxy or polyhaloethoxy and $R_2$ and $R_3$ are independently hydrogen or alkyl of up to 20 carbons with the proviso that no more than one of $R_2$ or $R_3$ can be hydrogen.

2. The magnetic recording medium of claim 1 wherein $R_1$ is an unsubstituted alkyl of from 4 to 10 carbons, and $R_2$ and $R_3$ are independently methyl, octyl, dodecyl or octadecyl.

3. The magnetic recording medium of claim 1 wherein the aromatic moiety of $R_1$ can contain one or more nitrogen atoms within a ring.

4. The magnetic recording medium of claim 1 wherein the aromatic moiety of $R_1$ is phenoxyphenyl, phenyl, naphtyl, biphenyl, quinolinyl, pyridinyl, pyridazinyl or pyrimidinyl.

5. The magnetic recording medium of claim 1 wherein $R_1$ is a trihalomethyl substituted aromatic moiety, $R_2$ is n-octyl, and $R_3$ is n-octyl.

6. The magnetic recording medium of claim 1 wherein at least one sulfonamide is N-dodecylbenzenesulfonamide, N,N'-di-n-octyl-2,4-bis(2,2,2-trifluoroethoxy) benzenesulfonamide, N,N'-di-n-octyl-3-trifluoromethylbenzenesulfonamide, N,N'-di-n-octyl-2,4-diethoxybenzenesulfonamide, N,N'-di-n-octyl-4-(3-trifluoromethylphenoxy)benzenesulfonamide, N,N'-di-n-octyl-2,4-dichlorobenzenesulfonamide, N,N'-di-n-octyl-3,4-difluorobenzenesulfonamide, N,N'-di-n-octyl-8-quinolinesulfonamide, N,N'-di-n-octyl-4-phenoxybenzenesulfonamide, N-N'-di-n-octyl-4-chlorobenzenesulfonamide, N,N'-di-n-octyl-2-napthalenesulfonamide, N,N'-di-n-octylbenzenesulfonamide, N,N'-di-n-octylbutanesulfonamide, N,N'-di-n-octylpentafluorobenzenesulfonamide, N-dodecyl-3-trifluoromethylbenzenesulfonamide or N-octadecyl-3-trifluoromethylbenzenesulfonamide.

7. The magnetic recording medium of claim 1 wherein the at least one sulfonamide has an average thickness of from about 5 to about 100 ångströms.

8. The magnetic recording medium of claim 1 wherein the magnetic recording medium is a metal evaporated tape.

9. The magnetic recording medium of claim 1 wherein the medium is selected from the group consisting of rigid disks, ultra high density floppy disks, digital audio tape, 8 mm video tape and super VHS tape.

10. The magnetic recording medium of claim 1 wherein the lamina further comprises a protective overcoat between the magnetic layer and the at least one sulfonamide.

11. The magnetic recording medium of claim 10 wherein the protective overcoat is a carbon overcoat.

12. A process useful for lubricating a magnetic recording medium, comprising applying at least one sulfonamide to a surface of the magnetic recording medium to provide a sulfonamide film having an average thickness of 1 to 1000 ångströms on the surface, wherein at least one sulfonamide contains up to 60 carbon atoms and is of formula $R_1$—$SO_2NR_2R_3$, wherein $R_1$ is an unsubstituted alkyl of up to 18 carbons or an aromatic moiety of up to 12 carbons which can be substituted by halo, methyl, ethyl, methoxy, ethoxy, trihalomethyl, trihalomethoxy, or polyhaloethoxy and $R_2$ and $R_3$ are independently hydrogen or alkyl of up to 20 carbons with the proviso that no more than one of $R_2$ or $R_3$ can be hydrogen.

13. The process of claim 12 wherein $R_1$ is an unsubstituted alkyl of from 4 to 10 carbons, and $R_2$ and $R_3$ are independently methyl, octyl, dodecyl, or octadecyl.

14. The process of claim 12 wherein the aromatic moiety of $R_1$ can contain one or more nitrogen atoms within a ring.

15. The process of claim 12 wherein the aromatic moiety of $R_1$ is phenoxy phenyl, phenyl, naphthyl, biphenyl, quinolinyl, pyridinyl, pyridazinyl or pyrimidinyl.

16. The process of claim 12 wherein the aromatic moiety of $R_1$ is phenyl, naphthyl, quinolinyl or phenoxyphenyl.

17. The process of claim 12 wherein at least one sulfonamide is N-dodecylbenzenesulfonamide, N,N'-di-n-octyl-2,4-bis(2,2,2-trifluoroethoxy)benzenesulfonamide, N,N'-di-n-octyl-3-trifluoromethylbenzenesulfonamide, N,N'-di-n-octyl-2,4-diethoxybenzenesulfonamide, N,N'-di-n-octyl-4-(3-trifluoromethylphenoxy) benzenesulfonamide, N,N'-di-n-octyl-2,4-dichlorobenzenesulfonamide, N,N'-di-n-octyl-3,4-difluorobenzenesulfonamide, N,N'-di-n-octyl-8-quinolinesulfonamide, N,N'-di-n-octyl-4-phenoxybenzenesulfonamide, N-N'-di-n-octyl-4-chlorobenzenesulfonamide, N,N'-di-n-octyl-2-napthalenesulfonamide, N,N'-di-n-octylbenzenesulfonamide, N,N'-di-n-octylbutanesulfonamide, N,N'-di-n-octylpentafluorobenzenesulfonamide, N-dodecyl-3-trifluoromethylbenzenesulfonamide or N-octadecyl-3-trifluoromethylbenzenesulfonamide.

* * * * *